May 24, 1932.  W. F. HACKETT  1,859,298
FOOD WORKING TOOL
Original Filed July 6, 1929
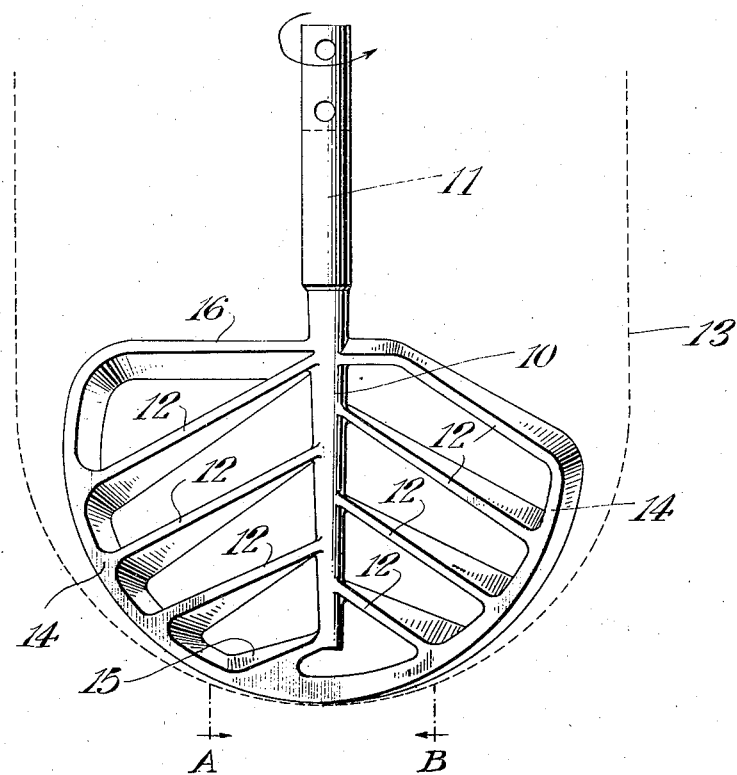
INVENTOR
William F. Hackett
BY
Cooper, Kerr & Dunham
ATTORNEYS Patented May 24, 1932

1,859,298

UNITED STATES PATENT OFFICE

WILLIAM F. HACKETT, OF NEW YORK, N. Y.

FOOD WORKING TOOL

Application filed July 6, 1929, Serial No. 376,326. Renewed August 2, 1930.

This invention relates to food working tools. More specifically, it relates to rotary food beating tools and from a still more specific aspect it relates to a rotary tool adapted to be inserted from above into a bowl or container of mayonnaise, batter, or similar food material, to beat the same, thoroughly blend the ingredients, etc.

Among other objects the invention has for its purpose to provide an efficient food beating tool which accomplishes its results in a comparatively short time. Other objects and advantages will appear as the invention is hereinafter disclosed.

Referring to the drawing which illustrates what I now consider a preferred form of the invention, the single figure is an elevation of the food beating tool, and in dotted lines I have shown the inner surface of a bowl or container into which the tool is adapted to be inserted and which is adapted to contain the food material to be operated upon.

The food beating tool is of the general type shown in Fig. 1 of my U. S. Letters Patent No. 1,712,143 patented May 7, 1929, and in Fig. 1 of my U. S. Letters Patent No. 1,712,-144 patented May 7, 1929, and is adapted to be operated by either of the machines shown in these patents or a similar machine.

When such a rotary food beating tool is inserted into the food material and rotated, it imparts rotation (but at an angular velocity lower than that of the tool) to the food material. The latter when rotated, is subject to two natural forces, one of which is the force of gravity tending to pull the food material and all portions thereof downwardly and the other of which is centrifugal force which throws the food material outwardly i. e. away from the axis of rotation.

The food beating tool illustrated comprises a vertical spindle 10 having at its upper end a member 11 adapted to be detachably secured to the downwardly extending chuck of the machine (not shown) for rotation thereby and therewith. In the present case the rotation is in the direction of the arrow shown at the upper end of the spindle. To this spindle there are secured a plurality of blades 12, each of these blades being secured to the spindle at its inner ends, preferably integrally. Each of these blades is pitched or twisted in the direction in which it extends from the spindle so that when rotated in the direction indicated by the arrow, the blades will exert a downward thrust upon the food material contained in the bowl or container whose inner surface is indicated, as stated, by the dotted line 13. Each of these blades 12 is also preferably downwardly sloped or inclined in the direction in which it extends away from the spindle 10. I have obtained the best results with the blades so sloped or inclined.

As stated when the food material is rotated centrifugal force thrusts or tends to throw it radially outward away from the axis of rotation, i. e. away from the axis of the spindle. While the blades 12, constructed as shown and above described, may in some degree at least overcome or offset this outward movement of the material due to centrifugal force I prefer to provide in addition means for exerting an inward thrust upon the material, i. e. radially inward toward the axis of the spindle. For this and other purposes I connect, preferably integrally, the outer ends of the blades 12 to a curved member 14 which is so pitched at its side portions that when the spindle is rotated in the direction of the arrow, these pitched side portions of the blade or member 14 will thrust the material inwardly in opposition to the centrifugal force. In effect, the member 14 comprises two pitched peripheral blades, one of which extends upwardly from the dot and dash line A and the other of which extends upwardly from the dot and dash line B.

There is also preferably provided, a lower blade 15 similar to each of the blades 12 and similarly mounted except that this lower blade 15 is reversely pitched with respect to the pitch of each of the blades 12 so that the blade 15, when the spindle 10 is rotated in the direction of the arrow, thrusts the material at the bottom of the bowl or container 13 upwardly. That portion of the member 14 which extends from one of the dot and dash lines A B to the other of such dot and dash lines constitutes a pitched blade which also thrusts or aids in thrusting the material at the lower portion of the container, upwardly.

It will be noted that one of the upper ends of member 14 is secured to the spindle 10 through one of the pitched blades 12 while its other upper end is secured to the spindle 10 through the pitched blade 16. The pitched blade 16, it will be noted, has a uniform pitch and does not slope or incline as in the case of the blades 12, although it may be sloped and pitched, if desired. The tool illustrated is a comparatively flat one, in practice preferably somewhere between one quarter (¼) and one half (½) inches in the direction perpendicular to the plane of the paper of the drawing.

I have found that the tool illustrated in the drawing and described above is a very effective one for beating food material. While I do not desire to be bound by my explanation of the theory of this operation, I believe it to be substantially as follows:

Assuming that the food material to be operated upon is in the bowl 13, which is preferably stationary, and that the tool is being rotated in the direction of the arrow at the desired speed: the blades 12 and 16 by virtue of their pitch throw or thrust the upper part of the material in a generally vertical downward direction. Due to the increase of pitch of the blades 12 as they extend outwardly from the spindle, the downward thrust exerted by them increases in the direction away from the spindle. By virtue of the shape of the container and the operation of centrifugal force, the tendency of the food material to rise due to its contact with the upwardly inclined side wall portions of the container is greatest near the container, i. e. remote from the spindle. It is, therefore, desirable that the downward thrust exerted by the pitch of blades 12 be greatest at their outer ends. The design and operation are such that the upper portion of the material moves downwardly. The lower blade 15, by virtue of its reversed pitch, and the portion of the member 14 extending between the dot and dash lines A and B exert an upward thrust upon the material, particularly in the zone adjacent the spindle, and this upward thrust in cooperation with the downward thrusts by the blades 12 and 16 causes a thorough mixing and beating motion of the material. In addition the inner surfaces of the side portions of the member 14, i. e. the portions thereof which extend upwardly from the dot and dash line A and upwardly from the dot and dash line B, by virtue of their pitch exert a radially inward thrust upon the material in opposition to the radially outward thrust of the centrifugal force and overcomes the centrifugal force and causes the outer portion of the material to move inwardly.

The centrifugal force thrusts the material radially outwardly with considerable force until it is either engaged by one or another of the whirling blades 12 or by the members 14 or by the side of the bowl, and, coming into violent contact with one or another of these members with considerable force, any lumps in the material are effectively and comparatively rapidly broken up and disintegrated. Also by being thrust downwardly by the blades 12 and 16 and upwardly by the blade 15 and the lower central zone of member 14, the material is not only rotated but thoroughly churned and commingled in various currents of the rotating mass to effect a thorough and comparatively rapid disintegration of any lumps, a thorough intermingling of the food ingredients and a thorough beating or mixing of the material. The tool is preferably made of aluminum although other materials may be employed.

The tool disclosed herein is adapted to be employed to beat mayonnaise, batter, boiled icings, frostings, candy, and the like. In the appended claims I employ the word "food" as including such, or similar, materials.

While at present I prefer substantially the construction shown in the drawing and described above, it will be understood that some of the features described may be omitted and/or modified within the scope of the broader of the appended claims, depending upon the degree of efficiency desired, the amount of material operated upon, and the conditions of use; within the skill of the average man skilled in the art to which the invention relates.

What I claim is:—

1. A rotary food beating tool comprising in combination, a member by which the tool is adapted to be rotated, a sloped blade for forcing the food downwardly upon rotation of the tool, a lower sloped blade for forcing the food upwardly upon rotation of the tool, and a sloped blade spaced from the axis of rotation of the tool for forcing the food inwardly toward the axis of rotation of the tool.

2. A rotary food beating tool comprising in combination, a spindle by which the tool is adapted to be rotated, a plurality of pitched blades secured to said spindle for forcing the food downwardly upon rotation of the blade, a lower blade secured to said spindle reversely pitched with respect to the first mentioned blades for forcing the food upwardly upon rotation of the tool, and pitched blades secured to the first mentioned blades at their outer ends for forcing the food inwardly toward the axis of rotation of the tool.

3. A rotary food beating tool comprising in combination, a spindle by which the tool is adapted to be rotated, a plurality of blades secured to said spindle, each of said blades being inclined downwardly in the direction away from the spindle, and each of said blades being pitched and pitched blades secured to the first mentioned blades at their outer ends for forcing the food inwardly toward the axis of rotation of the tool.

4. A rotary food beating tool comprising in combination, a spindle by which the tool is adapted to be rotated, a plurality of blades secured to said spindle, each of said blades being inclined downwardly in the direction away from the spindle, and each of said blades being pitched, the pitch of said blades increasing in the direction in which the blades extend from the spindle, and pitched blades secured to the first mentioned blades at their outer ends for forcing the food inwardly toward the axis of rotation of the tool.

5. A rotary food beating tool comprising in combination, a spindle about whose axis the tool is adapted to be rotated, a plurality of blades each secured at one end to said spindle and each of which inclines downwardly and outwardly from the spindle, each of said blades being pitched and the pitch increasing in the direction in which the blade extends from the spindle, a lower blade secured to said spindle and reversely pitched with respect to the pitch of the first mentioned blades, and a plurality of peripheral pitched blades connecting the outer ends of said first mentioned blades and said lower blade for forcing the food inwardly.

6. A rotary food beating tool comprising in combination, a member by which the tool is adapted to be rotated, a pitched blade for forcing the food downwardly upon rotation of the tool, a lower pitched blade for forcing the food upwardly upon rotation of the tool, and a pitched blade spaced from the axis of rotation of the tool for forcing the food inwardly toward the axis of rotation of the tool.

7. A rotary food beating tool comprising in combination, a member by which the tool is adapted to be rotated, a sloped and pitched blade for forcing the food downwardly upon rotation of the tool, a lower sloped and pitched blade for forcing the food upwardly upon rotation of the tool, and a sloped and pitched blade spaced from the axis of rotation of the tool for forcing the food inwardly toward the axis of rotation of the tool.

8. A rotary food beating tool comprising in combination, a spindle by which the tool is adapted to be rotated, a plurality of members secured at their inner ends to said spindle for thrusting the food downwardly, and pitched blades secured to said members at their outer ends for forcing the food inwardly toward the axis of rotation of the tool.

9. A tool as set forth in claim 8 in which the pitched blades are downwardly curved and extend toward each other at their lower portions whereby varying amounts of food in a bowl-shaped container may be forced inwardly upon rotation of the tool.

In testimony whereof I hereto affix my signature.

WILLIAM F. HACKETT.